United States Patent
Foglar et al.

(10) Patent No.: US 9,249,051 B2
(45) Date of Patent: Feb. 2, 2016

(54) CEMENT COMPOSITE WITH ENHANCED ABILITY TO ABSORB MECHANICAL ENERGY

(71) Applicant: Czech Technical University in Prague, Faculty of Civil Engineering, Prague (CZ)

(72) Inventors: Marek Foglar, Prague (CZ); Josef Fladr, Chlumcany (CZ)

(73) Assignee: CZECH TECHNICAL UNIVERSITY IN PRAGUE, FACULTY OF CIVIL ENGINEERING, Prague (CZ)

( * ) Notice: Subject to any disclaimer, the term of this patent is extended or adjusted under 35 U.S.C. 154(b) by 0 days.

(21) Appl. No.: 14/688,334

(22) Filed: Apr. 16, 2015

(65) Prior Publication Data
US 2015/0299038 A1 Oct. 22, 2015

(30) Foreign Application Priority Data
Apr. 17, 2014 (CZ) ..................................... 2014-263

(51) Int. Cl.
| C04B 7/02 | (2006.01) |
| C04B 16/06 | (2006.01) |
| C04B 18/04 | (2006.01) |
| C04B 7/26 | (2006.01) |
| C04B 12/04 | (2006.01) |

(52) U.S. Cl.
CPC . *C04B 7/26* (2013.01); *C04B 12/04* (2013.01); *C04B 16/06* (2013.01)

(58) Field of Classification Search
CPC .......... C04B 7/02; C04B 7/243; C04B 16/06; C04B 18/04
See application file for complete search history.

(56) References Cited

FOREIGN PATENT DOCUMENTS

| CZ | 300 195 B6 | 3/2009 |
| CZ | 303 207 B6 | 5/2012 |
| CZ | 304 475 B6 | 5/2014 |
| DE | 39 33 615 A1 | 4/1991 |
| DE | 40 10 898 A1 | 10/1991 |
| GB | 1089442 A | 11/1967 |
| GB | 1 404 077 A | 8/1975 |

OTHER PUBLICATIONS

Search Report dated Jan. 9, 2015, which issued in priorioty Czech Republic Application No. PV 2014-263.

*Primary Examiner* — Paul Marcantoni
(74) *Attorney, Agent, or Firm* — Buchanan Ingersoll & Rooney PC

(57) ABSTRACT

The new cement composite has a matrix made of silicate cement, which is filled with natural crushed aggregate of arbitrary mineralogical composition and/or with artificial aggregate based on expanded clays. The composite further contains mixing water and plasticizers, while their amount is given by the required workability and the rate of the cement composite placement into formwork. The silicate cement has a dosage from 300 to 620 kg/m$^3$ of composite and the aggregate is an aggregate with fraction 0-8 and dosage from 150 to 350 kg/m$^3$ of composite. The composite further contains roughly crushed fragments of natural and/or synthetic textile and/or filling material such as foam plastic with the dosage from 80 to 150 kg/m$^3$ of composite. These crushed fragments have arbitrary shape and their minimum dimension is in units of mm and the maximum dimension is up to tens of mm.

4 Claims, No Drawings

CEMENT COMPOSITE WITH ENHANCED ABILITY TO ABSORB MECHANICAL ENERGY

BACKGROUND OF THE INVENTION

Presented solution deals with a new formula of composite material where the cement matrix is reinforced by non-homogeneous textiles that may originate from waste products. Final material features mechanical behaviour, which allows to absorb various kinds of energy, for example acoustic, mechanical or other energy.

DESCRIPTION OF PRIOR ART

The principle of fibre-reinforced concrete is known for many years already, fibres added to the concrete mixture are made of steel, in such case we speak about steel-fibre-reinforced concrete, with dosage approx. 20-200 kg/m$^3$, or made of plastic with dosage approx. 1-12 kg/m$^3$. These cases involve thin wires or fibres respectively with precisely defined properties, which are specially produced for this purpose. Price of the fibres varies depending on their material and properties or origin. The principle of fibre-reinforced concrete is that a crack created by tensile stress is captured by distributed reinforcement formed by the fibres. Fibre-reinforced concrete composites feature better strain properties and lower shrinkage. The issue related to the fibre-reinforced concrete is in particular large scatter of mechanical properties, which results from imperfect distribution of fibres by mixing in the concrete.

At present, textile materials are added to the concrete, especially in the form of aligned woven textiles with clearly defined characteristics where the textiles are interlaced by concrete layers. Number of layers and their material vary depending on required final properties. Final composites however feature high price and therefore they are not commonly used in current design practice.

SUMMARY OF THE INVENTION

Setbacks mentioned above are removed by the cement composite with enhanced ability to absorb mechanical energy where its matrix is made of silicate cement and it is filled with natural crushed aggregate of arbitrary mineralogical composition and/or with artificial aggregate based on expanded clays. The composite further contains mixing water and plasticizers, while their amount is given by the required workability and the rate of the cement composite placement into formwork. The principle of the new solution is that the silicate cement has a dosage from 300 to 620 kg/m$^3$ of composite, the aggregate is an aggregate with fraction 0-8 and dosage from 150 to 350 kg/m$^3$ of composite, and the composite further contains roughly crushed fragments of natural and/or synthetic textile and/or filling material such as foam plastic. These fragments have arbitrary shape, and thus also the aspect ratio, and are dosed from 80 to 150 kg/m$^3$ of composite. Their minimum dimension is in units of mm and the maximum dimension is up to tens of mm according to material type. For threads or cloth ropes the smallest dimension is from tenths of mm up to units of mm and the bigger dimension can even exceed 20 mm. For crushed materials and other textiles the smaller dimension usually ranges from 1 to 5 mm, the bigger dimension from 10 to 30 mm. When a more rough crushed material is used, such as foam plastic, the minimum dimension ranges roughly from 5 to 10 mm and the maximum dimension is 30 and more mm.

The cement composite usually contains mixing water with the dosage from 300 l/m$^3$ to 450 l/m$^3$ of composite.

In a preferred embodiment the fragments of natural and/or synthetic textiles and/or filling material such as foam plastic originate from waste products.

In a preferred embodiment the dosage of silicate cement may be partially, roughly up to 60%, replaced by fly ash created during combustion of anthracite, black or brown coal. This will allow to save the amount of cement and will result in lower price of final composite, while the strength properties will be slightly inferior and the mixing water volume will be greater.

The new solution therefore consists in the design of the cement composite structure with the principle that it combines seemingly incompatible ingredients while innovative material properties are achieved, these mainly include enhanced ability of the cement composite to absorb mechanical energy. Strain properties as opposed to regular concretes are increased by 200 percent and more. The composite retains its compatibility even during great tensile strains and no so-called brittle fracture occurs in it as it is typical for regular concretes. Even under significant strain the composite retains its mechanical properties, which makes it predestined for structures exposed to high-speed acting loads (impact, blast, etc.). In such heavy load situations the material dissipates great amounts of energy while retaining its integrity.

DETAILED DESCRIPTION OF THE PREFERRED EMBODIMENTS

The principle of this new technology procedure for the cement composite production is therefore creation of such internal structure of the material that can with a positive effect accommodate fragments of natural or synthetic textiles or filling material such as foam plastic, which can be advantageously formed by crushing or ripping, e.g. during waste disposal of discarded cars, furniture, etc., while the resulting strain properties of the composite significantly exceed these values of regular cement composites in the sphere of mechanical energy absorption.

The composite structure is formed by the cement matrix filled with natural crushed aggregate of arbitrary mineralogical composition or with artificial aggregate based on expanded clays, or possibly their combination. During the final stage of composite production the composite textile fragments are added, these can have arbitrary shape and may originate from waste products. These textile fragments may be roughly crushed to stripes, shreds and cloth ropes with minimum dimension in units of mm and the maximum dimension up to tens of mm, having various shapes and aspect ratios, and subsequently used for the composite production. These may include natural textiles such as cotton, silk, etc., textiles made of artificial fibres, cloth ropes, filling materials such as foam plastic and other. These elements are a priori unsuitable as additives for concrete because they do not overtake the function of distributed reinforcement as in the fibre-reinforced concrete but they in a controlled way introduce to the concrete mixture heterogeneity, which when the concrete mixture is designed precisely, can result in unique material properties of the final cement composite. These are in particular reflected by extensive mechanical energy absorption under loading.

In order to facilitate the explanation we present the following example of the testing cubes behaviour. While the testing cube made of regular concrete without added fibres fails by tensile crack as a result of transverse tension, the cube made of the described cement composite starts crushing only after exceeding the pressure load capacity of the concrete matrix among the textile fragments. Due to their yielding the cube does not break when the transverse tension is applied but it keeps its shape and by deforming the matrix it dissipates the input energy, thus absorbing it.

These properties may be advantageously exploited for example for absorbers of impacts, blasts, or for lining that can protect fragile structures by being destroyed first.

The cement matrix in the composite is made of silicate cement with dosage from 300 to 620 kg/m³ of composite. Exact dosage depends on the kind of used aggregate and its mineralogical and geological origin. The aggregate with fraction 0-8 is added to the composite with dosage from 150 to 350 kg/m³ of composite, where its dosage depends mainly on its origin. Synthetic and/or natural textile material and/or filling material such as foam plastic is dosed from 80 to 150 kg/m³ of composite. Exact composition of the mixture including the amounts of mixing water and plasticizer is determined based on the properties of added textiles, it means depending on their origin, crushing fineness, material, etc., on required workability and the rate of the cement composite placement into formwork. Typical dosage of water ranges from 300 to 450 l/m³ of composite.

In order to verify declared properties of the composite we present two reference formulae, which were used for the composite mechanical properties verification. Testing body had a block shape. The first formula for the composite is compiled for artificial aggregate made of expanded clays.

1. Formula Example:

|  |  | kg/m³ |
|---|---|---|
| Cement |  | 590 |
| Artificially produced aggregate | 0/8 | 170 |
| Synthetic textile material |  | 100 |
| Water |  | 380 |

Compression Strength Results

| Sample reference No | Testing body dimensions (mm) | Weight (kg) | Specific density (kg/m³) | Force (kN) | Strength (MPa) |
|---|---|---|---|---|---|
| 91.1 | 150 150 146 | 4.175 | 1271 | 125 | 5.71 |
| 91.2 | 150 150 146 | 3.985 | 1213 | 110 | 5.02 |
| 91.3 | 150 150 154 | 3.827 | 1104 | 105 | 4.55 |
| Mean value |  | 3.995 | 1181 |  | 5.09 |

Behaviour of the material was also verified by fire test. During the test the samples were loaded by standardized temperature curve and subsequently they were subjected to the residual compression strength verification.

Residual Compression Strength Results

| Sample reference No. | Testing body dimensions (mm) | Weight (kg) | Specific density (kg/m³) | Force (kN) | Strength (MPa) |
|---|---|---|---|---|---|
| 91.4 | 150 150 151 | 2.805 | 826 | 18 | 0.794 |
| 91.5 | 150 150 150 | 2.885 | 855 | 24 | 1.052 |
| 91.6 | 150 150 152 | 2.740 | 801 | 15 | 0.662 |
| Mean value |  | 2.810 | 827.2 |  | 0.836 |

2. Formula Example:

|  |  | kg/m³ |
|---|---|---|
| Cement |  | 505 |
| Artificially produced aggregate | 4/8 | 135 |
| Natural aggregate | 0/4 | 170 |
| Synthetic waste material |  | 100 |
| Water |  | 380 |

Compression Strength Results

| Sample reference No. | Testing body dimensions (mm) | Weight (kg) | Specific density (kg/m³) | Force (kN) | Strength (MPa) |
|---|---|---|---|---|---|
| 92.1 | 150 150 154 | 4.05 | 1169 | 100 | 4.33 |
| 92.2 | 150 150 148 | 3.82 | 1147 | 78 | 3.51 |
| 92.3 | 150 150 152 | 4.2 | 1228 | 102 | 4.47 |
| Mean value |  | 4.02 | 1181 |  | 4.11 |

Modulus of elasticity of the final composite may vary depending on the mixture design, typical range is 2000-3000 MPa.

Cement composite complies with the reaction to fire class B tested according to the standard EN 13501-1 for both formulae.

Thermal technical parameters of the cement composite vary based on specific composition but they always must comply with the following interval:

thermal conductivity coefficient 0.4 to 0.7 W/(m·K), specific heat capacity 900 to 1300 J/(kg·K).

INDUSTRIAL APPLICABILITY

The developed material may be advantageously used for production of e.g. absorbers of impact, blast, or for lining that can protect fragile structures by being destroyed first. Cement composite therefore can be deployed as a walling material, as a lining material with thermal and acoustic insulation functions and as a material fulfilling the function of absorber of high-speed acting loads.

The invention claimed is:

1. A cement composite with enhanced ability to absorb mechanical energy where its matrix is made of silicate cement and it is filled with natural crushed aggregate of arbitrary mineralogical composition and/or with artificial aggregate based on expanded clays and where the cement composite further contains mixing water and plasticizers, while their amount is given by the required workability and the rate of the cement composite placement into formwork wherein the silicate cement has a dosage from 300 to 620 kg/m$^3$ of the cement composite, the aggregate is an aggregate with fraction 0-8 mm and dosage from 150 to 350 kg/m$^3$ of the cement composite, and the cement composite further contains crushed fragments of natural and/or synthetic textile and/or filling material with the dosage from 80 to 150 kg/m$^3$ of the cement composite, where these crushed fragments have arbitrary shape and their dimension is tenths of a mm to 30 and more mm, and wherein the aggregate and the natural and/or synthetic textile and/or filing material are different materials.

2. The cement composite according to claim 1, wherein the cement composite contains mixing water with the dosage from 300 l/m$^3$ to 450 l/m$^3$ of the cement composite.

3. The cement composite according to claim 1, wherein the fragments of natural and/or synthetic textiles and/or filling material originate from waste products.

4. A cement composite with enhanced ability to absorb mechanical energy where its matrix is made of silicate cement and it is filled with natural crushed aggregate of arbitrary mineralogical composition and/or with artificial aggregate based on expanded clays and where the cement composite further contains mixing water and plasticizers, while their amount is given by the required workability and the rate of the cement composite placement into formwork wherein the silicate cement has a dosage from 300 to 620 kg/m$^3$ of the cement composite, the aggregate is an aggregate with fraction 0-8 mm and dosage from 150 to 350 kg/m$^3$ of the cement composite, and the cement composite further contains crushed fragments of natural and/or synthetic textile and/or filling material with the dosage from 80 to 150 kg/m$^3$ of the cement composite, where these crushed fragments have arbitrary shape and their dimension is tenths of a mm to 30 and more mm, wherein the aggregate and the natural and/or synthetic textile and/or filing material are different materials, and wherein the dosage of silicate cement is partially replaced by fly ash created during combustion of anthracite, black or brown coal up to maximum 60% of the dosage.

* * * * *